Dec. 25, 1934.  W. M. THOMAS  1,985,470
PROJECTOR SYSTEM AND DETAIL
Filed Nov. 21, 1933  4 Sheets-Sheet 1

INVENTOR:
William M. Thomas,
By Fred W. Hann
ATTORNEY.

Dec. 25, 1934.   W. M. THOMAS   1,985,470
PROJECTOR SYSTEM AND DETAIL
Filed Nov. 21, 1933   4 Sheets-Sheet 2

INVENTOR:
William M. Thomas
BY
Fred W Harris
ATTORNEY.

Patented Dec. 25, 1934

1,985,470

UNITED STATES PATENT OFFICE 1,985,470

PROJECTOR SYSTEM AND DETAIL

William M. Thomas, Los Angeles, Calif.

Application November 21, 1933, Serial No. 698,997

25 Claims. (Cl. 88—16.4)

My invention relates to the motion picture art, and more particularly to a novel projection apparatus which finds particular utility in projecting color pictures, though the invention and certain of the details of construction are not limited to these arts.

In the additive method of projecting colored images onto a screen, adjacent color-value images appearing on a film are projected onto a screen either simultaneously or successively, the projection beams being passed through color filters corresponding to the filters used when the color-value images were exposed. Various attempts have been made to use a single lens system for focusing the images onto the screen, a complex system of prisms being used to split the beam. Accurate registration of the projected images is extremely difficult to attain with such a system, and often such a system necessitates that one of the split portions of the beam travels over a greater distance than another portion in reaching the screen. The result is that the resulting composite image does not appear in true perspective and the constituent images are not of identical shape, thus preventing accurate registration.

It is an important object of the present invention to use a pair of adjacent lens systems for projecting the composite image, and to so form these lens systems that the optical axes thereof are close together.

I have found that one of the most important factors in reducing the apparent flicker in the composite image is in the proper design of the lens systems used. My experiments definitely indicate that certain stray light rays move toward the screen but are positioned outside the actual picture area of the screen. This outer portion beyond the picture area is ordinarily made black in an attempt to make these stray rays invisible, but I have found that these rays actually create an optical illusion making it appear to the spectator as if the flicker were taking place in the picture area itself. This illusory flicker can be effectively eliminated by proper shaping of the lens contour and using only the central portion of the lens system for projection purposes, the structure eliminating this flicker being included among the objects of the present invention.

When a lens means comprising two vertically disposed lens systems positioned side by side is used there is a tendency for a distinct flicker to be formed at the top and bottom of the projected image, especially where the adjacent portions of the lens systems are cut away to permit the optical axes to be positioned closer together. My experiments show, however, that this flicker can be eliminated by grinding away the outer edges of each lens system, a portion of the lens elements being removed at the upper side of the upper lens system and at the lower side of the lower lens system, if the lens systems are spaced one above the other. If the lens systems are horizontally disposed with respect to each other, the flicker will appear at the sides of the projected image so that the extreme edge portions of each lens system will be removed to eliminate this color beat. It is thus a further object of the invention to eliminate flicker appearing at opposite ends of the projected image by suitable design of the lens systems.

In the present invention I prefer to simultaneously project the color-value images appearing on adjacent frames of the film, and it is another object of the invention to so design the lens systems that the optical axes thereof respectively pass through substantially the exact centers of the adjacent frames, thus preventing any distortion due to a spreading apart of the light rays passing through the optical axes and permitting an optically correct projection system.

A further object of the invention lies in the provision of a novel septum separating these lens systems and extending rearward toward the lineal space separating the adjacent color-value images, and in the provision of an expansible septum structure to allow focusing.

Further objects of the invention lie in the novel adjustment means herein described for adjusting the lens systems for focus, lateral registration and longitudinal registration of the constituent images.

Among these adjustments is the movement of one or both lens systems toward and away from each other. It is an object of the present invention to thus relatively move the lens systems by pivoting one or both lens systems about an axis positioned between the lens system and the film and preferably positioned close to the film.

The provision of a novel lens-mounting structure is also one of the objects of the present invention.

Heretofore it has been customary when using a rotating shutter to pivot this structure in such a position that the shutter blade sweeps through the beams in succession. I have found that this is a primary cause of color beat and flicker, for at one instant of time an image of only one color will be projected, while at a later instant of time an image of another color will be projected. During these short intervals of time there is no composite image formed, and the result is a color beat and flicker which has heretofore prevented wide commercial use of such an additive system. It is an important object of the present invention to so mount the shutter that the blade thereof substantially simultaneously enters and similarly leaves the beams, thus completely overcoming this defect.

A further object of the invention is to pivot the color filters and shutter about a common axis, and preferably to position this axis on the same side of each lens system.

Greatly improved results are obtained by the use of a single-blade shutter moving at a speed which is much greater than the speed previously utilized. Such a system results in the elimination of all apparent flicker of the image due to the higher speed at which the shutter blade enters and leaves the beam. In addition, this factor has been found to be very important in the production of color images by the use of the additive method in that it eliminates color beat and gives a resultant image which appears much more perfect to the eye than has heretofore been possible. In this connection, I prefer to rotate the single-blade shutter at such speed that the number of revolutions thereof over a given period of time is a multiple of the number of times that the film is advanced during the corresponding time. This results in making the single-blade shutter serve a dual purpose, for this blade not only produces a cut-off period during which the film may be advanced, but in addition moves through the beams one or more times during the time that the film is stationary. The effect created on the eye of the observer is that the flicker is made imperceptible and the color values are materially bettered.

The provision of such a high-speed shutter system is one of the important objects of the present invention, regardless of whether such a shutter is used in projecting color pictures or the ordinary black and white images.

Another novel feature of the present improved structure is the gear box of equivalent variable-speed structure for controlling the net and relative speeds of the shutter and color screen.

When a film is used which provides adjacent images of different color value, it becomes necessary to correctly position the color screen with respect to the images being projected at any given instant of time. It is an object of the present invention to provide a novel structure for shifting the color screen with respect to the film to bring the images and color filters into correct relationship. This structure also can be used to change this relationship if a previous operator has improperly spliced the film following a parting thereof.

Other objects and advantages of the invention will be made evident hereinafter. It should not be understood, however, that all of the features of the present invention are limited to a projector combination. Many of the features herein disclosed find utility aside from their use in a projector. Included among these features are the lens system and its adjustments, the expansible septum system, and the shutter combinations together with associated driving and shifting mechanism.

Referring to the drawings.

Figure 1:
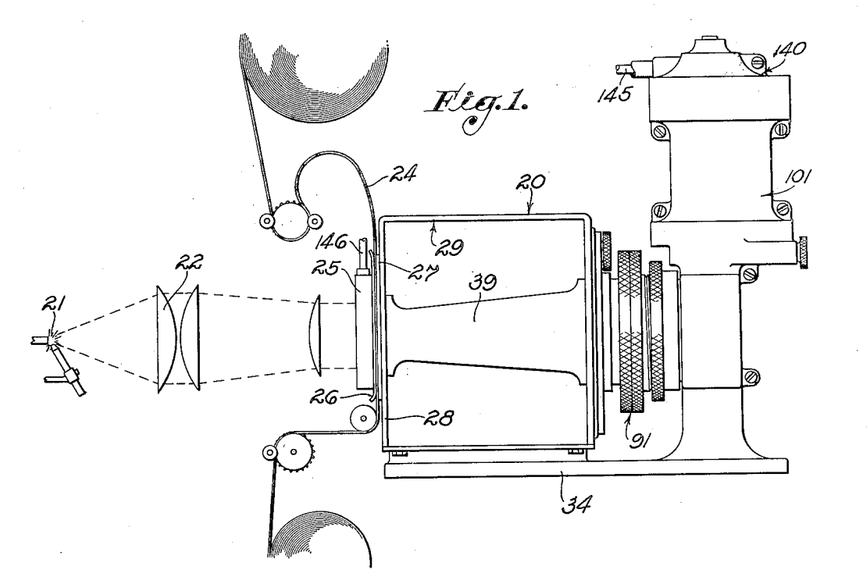
Fig. 1 is a diagrammatic view illustrating a portion of the projector in elevation.

Referring particularly to Fig. 1, the projector of my invention is indicated by the numeral 20 and is shown as being equipped with any suitable light source, the one illustrated including a carbon arc 21 and a condenser lens system 22. This condenser system is of such character as to concentrate the light from the light source in an area defined by two adjacent frames of a motion picture film 24 which film is advanced one frame at a time by an advancing means 25, the details of which form no part of the present invention.

Figure 2:
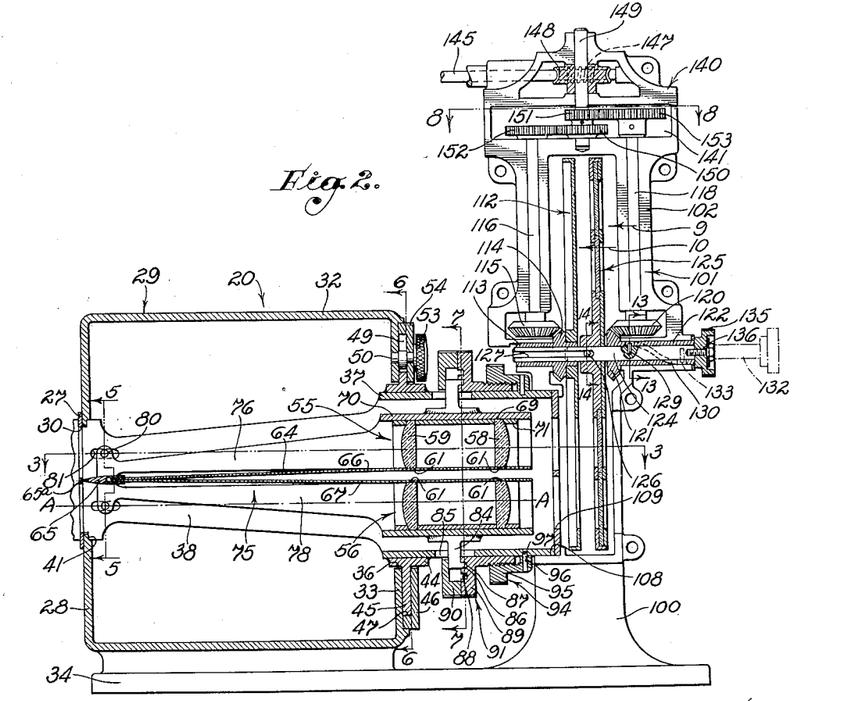
Fig. 2 is a vertical sectional view of the preferred embodiment of the invention.
Figure 3:
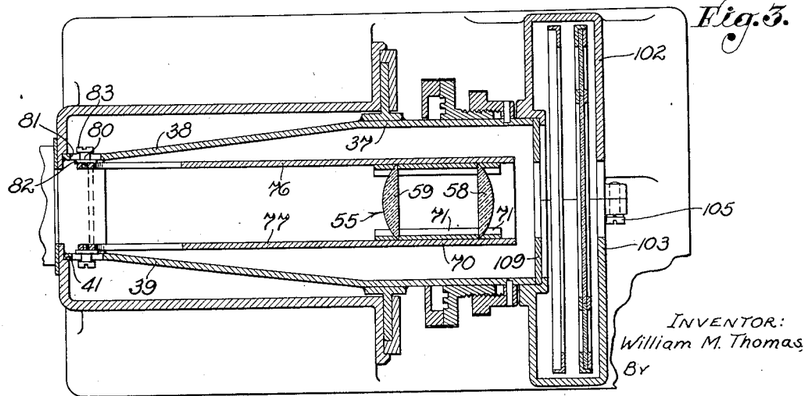
Fig. 3 is a horizontal sectional view taken on the line 3—3 of Fig. 2.
Figures 4, 5, 13, 15, 16:
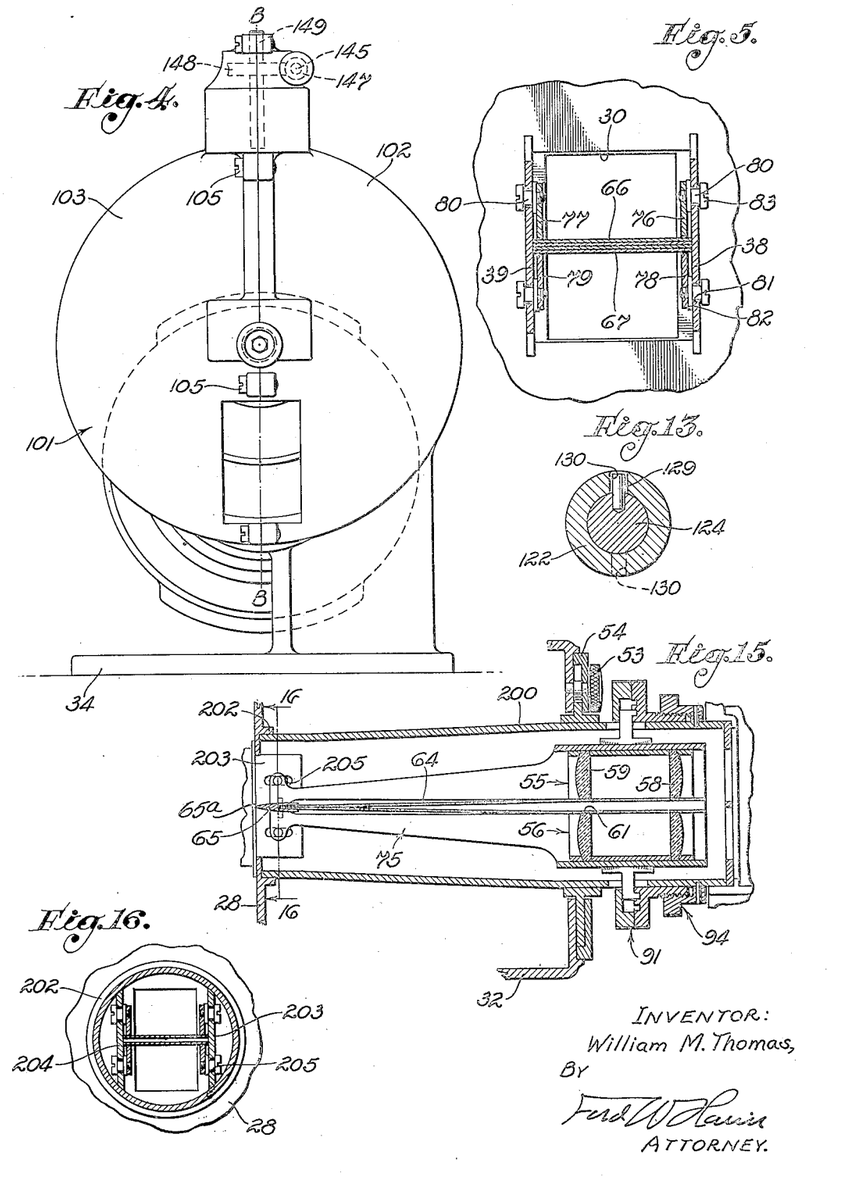
Fig. 4 is a front view of the projector.
Figs. 5, 6, 7, and 8 are sectional views illustrating further details of construction and are taken along respective lines of Fig. 2.
Figs. 13 and 14 are sectional views of the drive means for the filter support and are taken along the corresponding lines of Fig. 2.
Fig. 15 is a vertical sectional view of an alternative form of lens supporting structure.
Fig. 16 is a sectional view taken on the line 16—16 of Fig. 15.

If desired this film may extend between a guide plate 26 and an aperture plate 27 suitably secured to a rear wall 28 of an enclosing structure 29. As best shown in Figs. 2, 3, and 5 the aperture plate 27 provides two apertures 30 which are respectively disposed opposite adjacent frames on the film so that two adjacent images on the film 24 are simultaneously projected.

The enclosing structure 29 also includes surrounding walls 32 extending forward from the rear wall 28 and supporting a front wall 33. One of these forward extending walls preferably forms a door so that access can be had to the interior of the enclosing structure 29. A base 34 forms a support for the projector.

Extending through an opening 36 of the front wall 33 is a lens enclosing structure in the form of an outer barrel 37. This outer barrel may conveniently be formed of a piece of tubular material, the upper and lower portions being cut away to form arms 38 and 39 which extend rearward toward the film. The rear ends of these arms are preferably flattened so that they lie in a vertical plane. If desired, they may be notched as shown in Fig. 2 and extend into a correspondingly notched opening 41 of the rear wall 28, this opening being slightly larger in size than the combined openings of the aperture plate 27. The rear ends of the arms 38 and 39 in this form of the invention are permanently secured to the rear wall 28 by any suitable means, not shown.

The outer barrel 37 is pivotally mounted with respect to the front wall 33 so that it can be rotated about its horizontal axis a slight angular distance, this outer barrel being made of sufficiently thin material so that the arms 38 and 39 will flex sufficiently to permit a slight turning of the forward end of this outer barrel. The journalling means shown includes in part a collar 44 suitably secured to the outer barrel and carrying an outward extending flange 45. A cover plate 46 is detachably connected to the front wall 33 and provides a chamber 47 in which the flange 45 may be turned.

As will be hereinafter pointed out, this slight turning movement of the outer barrel 37 is for the purpose of adjusting the lateral position of the resulting images formed on the screen. Any suitable means may be utilized to secure this slight rotational movement of the outer barrel 37, but in the preferred embodiment I form a slot 49 with walls extending radially inward from the periphery of the flange 45, this slot being best shown in Figs. 2 and 6. A shaft 50 is pivoted in the forward wall 33 and in the cover plate 46 and extends through this slot. Carried by this shaft and positioned in the slot 49 so as to be engageable with the walls thereof is a cam or eccentric 51 so that when the shaft 50 is manually turned through a knurled head 53 positioned thereon the outer barrel 37 will be pivoted about its horizontal axis in degree depending upon the degree of rotation of the shaft 50. In the form shown in Fig. 2 this pivoting action is permitted due to the flexing of the arms 38 and 39. This mechanism whereby the outer barrel 37 is pivoted comprises a lateral adjustment means 54.

Figures 7, 9, 11:
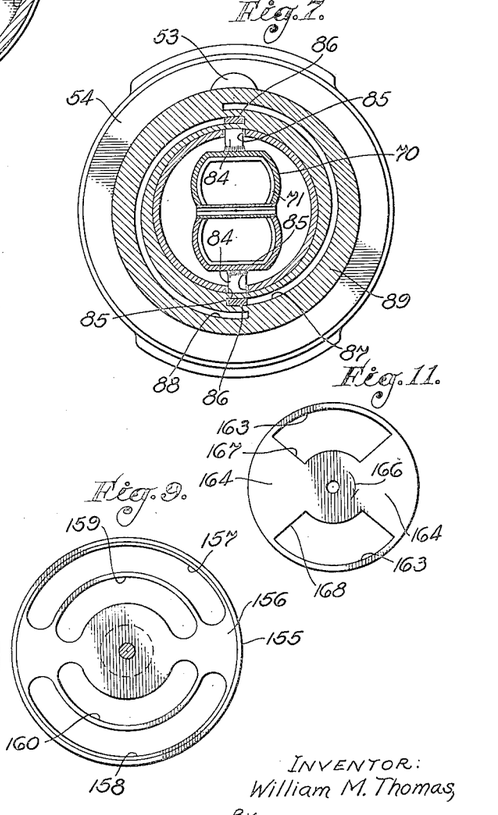
Fig. 9 is a face view of one form of filter support taken as indicated by the arrow 9 of Fig. 2.
Figs. 11 and 12 illustrate alternative forms of shutter construction.
Figure 8:
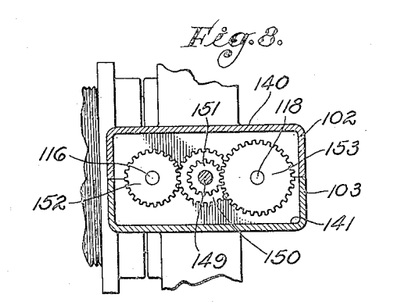

As best shown in Figs. 2 and 7 this form of projector includes a pair of vertically disposed lens systems indicated in general by the numerals 55 and 56 and positioned in the outer barrel 37 respectively above and below the horizontal axis thereof. These lens systems may be of any desired form, though the lens structure to be hereinafter described has been found to be a very important feature in eliminating flicker if the projector is used in producing colored or the conventional black and white motion pictures. In some instances each lens system may include a single lens element, but in the preferred embodiment I use at least two of these lens elements in each lens system, these lens elements being respectively designated by the numerals 58 and 59.

Regardless of the type of lens elements utilized, it has been found very desirable to have the optical axes of the lens systems 55 and 56 pass respectively through substantially the exact center of the adjacent frames being projected and to maintain this relationship regardless of the adjustment of the lens system. Thus, in Fig. 2 the line 3—3 represents the optical axis of the lens system 55, while the line A—A represents the optical axis of the lens system 56.

Figure 6:
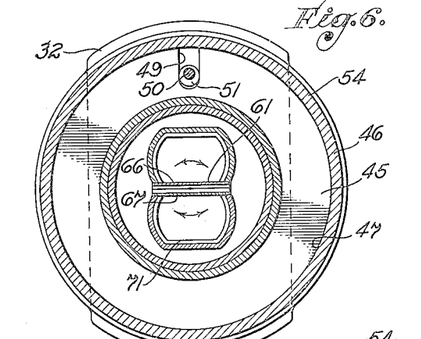

In accomplishing this positioning of the optical axes it is preferable to flatten those edges of the lens elements 58 and 59 of each lens system which lie closest to the lens elements of the adjacent lens system. This allows the optical axes to be spaced a distance substantially equal to the center-to-center spacing of the film images, a construction which is otherwise impossible unless extremely small lens elements are used. In Figs. 2 and 6 I have designated the flattened surfaces of the lens elements by the numerals 61.

It is also desirable to confine the light rays respectively passing through the adjacent frames so that they move through the corresponding lens systems, thus preventing any cross rays which would produce distortion on the resulting composite image. In accomplishing this end it is preferable to use an expansible septum construction extending between the lens systems 55 and 56 and the film. In the form shown, this expansible septum construction includes a septum element 64 movable with the lens systems, and a second septum element 65, these elements being telescopically disposed with relation to each other to permit focusing, as will be hereinafter described. For this purpose one of these elements, shown as the element 65 is formed as a sheath or socket into which a blade or plate formation at the end of the element 64 slidably fits, though within the contemplation of the invention this relation might be reversed. The septum element 65 is as shown in the form of a U-shaped member of relatively small dimensions, the shape of this member, as illustrated in the drawings, being exaggerated in size to show the construction thereof. The rear portion of this U-shaped member is preferably thinned so as to be of a dimension which is commensurate with the lineal space between adjacent frames, this space usually being in the neighborhood of .005″. This septum member 65 is suitably secured in stationary position immediately in front of, and forming a continuation of, the rib 65a of the aperture plate which extends between the film apertures. If desired, it may be secured to the arms 38 and 39. In the preferred embodiment, the septum element 64 includes septum members 66 and 67 which are in the form of substantially flat plates extending in contact with or adjacent the flattened surfaces 61 of the lens elements of the lens systems 55 and 56 as best shown in Fig. 2.

I have also found it very desirable to flatten or cut away those portions of the lens elements 58 and 59 opposite the flattened surfaces 61, these outer flattened surfaces being indicated by the numeral 69. My experiments adequately show that when using a vertically disposed dual-lens system for projecting motion pictures onto a screen the upper and lower portions of the projected image show a distinct flicker. This flicker does not appear at the side portions of the image and is apparently set up due to the fact that a portion of the lens elements have been cut away in forming the flattened surfaces 61. Careful experiments indicate that this flicker is formed by the extreme outer portions of the lens elements, and I have found that by eliminating these sharp outer portions the flicker is eliminated. I have further found that it is necessary to eliminate only a portion of these sharp edges. When vertically disposed lens systems are utilized only the upper ends of the lens elements of the lens system 55 need be flattened, together with the lower portions of the lens elements in the lens system 56. This slight flattening of these lens elements does not greatly decrease the amount of light transmitted, and, if desired, slightly larger lenses may be used than would ordinarily be considered practical on a dual-lens projector. The use of such larger lenses is made possible by the flattening of the inner portions of the lens elements to form the flattened surfaces 61, thereby permitting the optical axes of the lens systems to be positioned closer to each other than would otherwise be the case. This type of lens element or lens system is an important auxiliary feature of the present invention. Usually if a vertically disposed lens system is used, each lens system is so formed that the distance between the optical axis and the flattened surface 61 is materially less than the radial distance from the optical axis to the periphery of the lens system as measured transverse to a line joining the flattened surface 61 and the optical axis. So also the transverse dimension of the lens is ordinarily materially greater than the distance between the flattened surfaces 61 and 69.

Any suitable means may be utilized for mounting the lens elements. If desired, these elements may be mounted in a lens case 70 of the shape shown in Fig. 7, the corresponding septum member closing the inner end of this lens case. The lens elements may be retained therein by any means well known in the art. Diagrammatically I have illustrated a plurality of sleeves 71 fitting in the lens case and holding the lens elements in proper relationship.

In effecting vertical or longitudinal adjustment of the resulting images, it is very desirable to be able to move one of the lens systems with respect to the other. In the form shown wherein two lens systems are utilized spaced vertically with respect to each other, this adjustment may take the form of a movement of one or both of the lens systems toward and away from each other. Considering at least one lens system being thus adjustable, I have found it extremely desirable to pivot this lens structure about a point lying between the lens structure and the film. If desired, the lens elements and lens case 70 may be permanently secured to the septum member 66 so that this septum member itself may flex to form the pivot means for the lens system.

In other instances it is preferable to utilize a definite pivot means positioned between the film and the lens systems, as disclosed, for instance, in Fig. 2. As shown, a mounting means 75 extends rearward from the lens case 70, this mounting means being illustrated as comprising thin arms 76 and 77 associated with the upper lens case 70, and arms 78 and 79 (see Fig. 5) extending rearward from the lower lens case. Carried by each arm is a pivot pin 80 which extends through an elongated slot 81 correspondingly spaced in the arms 38 and 39. This slot is preferably elongated in a direction parallel to the optical axis of its associated lens system so as to permit this lens system to move toward and away from the film to effect focusing, as will be hereinafter described. While I have illustrated the pin 80 as carried by the arms 76, for instance, and sliding in an elongated groove of the arm 38, it should be clear that a reverse construction could be utilized by mounting the pin 80 in the arm 38 and sliding in an opening in the arm 76. In the form shown, however, it is usually desirable to provide the pin 80 with an enlarged head 83, and to position a washer 82 between the arms 76 and 38, for instance. It is preferable to pivot the lens structure about an axis which is not only adjacent the film but which is also in alignment with the optical axis and which preferably extends parallel to the plane of the film. In this way the optical axis of the corresponding lens system will always move substantially through the exact center of the corresponding frame regardless of any movement of the lens system about the pivot pin.

It is usually desirable to simultaneously move the lens systems 55 and 56 toward and away from each other to effect vertical or longitudinal adjustment of the screen images, though as pointed out above it is not necessary in all instances to move both lens systems. In the embodiment shown, each lens case 70 has secured thereto an outward extending arm 84 which extends through an elongated opening 85 of the outer barrel 37. This opening is preferably elongated parallel to the optical axis and is of such width as to prevent any turning of the lens system with respect to the outer barrel 37. Conversely, any slight turning of this outer barrel through adjustment of the lateral adjustment means 54 will relatively move the lens systems 55 and 56 sidewise with respect to each other, thus effecting the lateral adjustment previously described.

The outer end of each arm 84 carries a pin 86, these pins respectively fitting into and being guided by spiral slots 87 and 88 formed in a sleeve member 89. As best shown in Fig. 7, these spiral slots do not intersect, each slot extending from a position close to the outer barrel 37 to a position more removed therefrom. Thus, when the sleeve member 89 is turned the arms 84 will be moved toward and away from each other depending upon the direction of rotation, thus moving the lens systems therewith. The pins 86 are held in their respective grooves by a cover member 90 providing an annular groove therein in which these arms may turn. This cover member is suitably attached to the sleeve member 89 by means not shown. The outer portions of the sleeve member 89 and the cover member 90 are preferably knurled to permit ready manual adjustment. This means whereby the lens systems 55 and 56 are moved toward and away from each other is hereafter termed a lateral adjustment means and is indicated in general by the numeral 91.

Any suitable focus adjustment means may be utilized, the preferred form being indicated by the numeral 94. In the form shown the sleeve member 89 provides a forward-extending externally threaded portion which fits into corresponding female threads formed in a focusing ring 95. This focusing ring carries two or more pins 96 which extend into an annular channel 97 formed completely around the outer barrel 37. It is thus impossible for the focusing ring 95 to be advanced or retracted with respect to the outer barrel 37. However, a relative rotation between this focusing ring 95 and the lateral adjustment means 91 will advance or retract the sleeve member 89 and thus the lens systems 55 and 56. However, when the lateral adjustment means 91 is turned, the focusing ring 95 moves therewith so that no focusing action is obtained during adjustment of the longitudinal adjustment means 91. If this means is held in fixed position and the focus adjustment means 94 turned, the result will be that the lens systems 55 and 56 are simultaneously moved toward or away from the film depending upon the direction of rotation of the focusing ring 95.

While the apparatus hereinbefore described can be utilized in conjunction with conventional shutter and color filters, I have found that greatly improved results accrue from the use of the shutter and color filter systems which will now be described in detail.

Referring particularly to Figs. 1 to 3, a front post 100 may extend upward from the base 34 to support this mechanism. The mechanism itself is positioned in an enclosing structure 101 which is preferably of split construction, including enclosing elements 102 and 103 separable in a vertical plane indicated by the line B—B of Fig. 4. These enclosing elements are detachably connected together as by screws 105. The vertical plane indicated by the line B—B preferably passes through the optical axes of the lens systems 55 and 56 and through the horizontal axis of the outer barrel 37. This permits the formation of a socket 108 in the enclosing structure 101 to journal the forward end of the outer barrel 37. It is usually desirable to position a double-frame aperture plate 109 at the forward end of the outer barrel 37 so as to cut off any unnecessary side rays, and this aperture plate may be conveniently secured to the outer barrel 37 so that it can turn in the socket 108. The split construction of the enclosing structure makes the insertion of this outer barrel in the socket 108 a relatively simple matter.

It is preferable, although not always necessary, to use a rotary shutter and filter support. If such rotary elements are used, it is an important detail of the present invention to rotate these elements about a common axis, and I have found that the placement of this axis is an important factor if best results are to be obtained. Usually the axis should be positioned in or near the plane passing through the optical axes of the two lens systems 55 and 56.

In the form shown I have illustrated a shutter 112. This shutter is attached to the forward end of a sleeve 113 journalled in half-bearings respectively formed by the enclosing members 102 and 103. This sleeve carries a bevel gear 114 against which the shutter may be fixed, this bevel gear meshing with a similar bevel gear 115 carried by a shaft 116 similarly journalled in half-bearings respectively formed by the enclosing members. Rotation of this shaft 116 thus drives the shutter.

A similar shaft 118 is also journalled in the enclosing members 102 and 103 and carries a bevel gear 120 which meshes with a corresponding bevel 121 mounted on a sleeve 122. This sleeve is also journalled in the enclosing members. Extending through both the sleeves 122 and 113 is a shaft 124 which drives the filter support 125 to be hereinafter described. This drive is effected through the use of a pin 126 carried by a hub of the filter support 125 and extending into a longitudinal keyway 127 formed in the shaft 124. The filter support 125 is thus operatively connected to the shaft 124 at all times regardless of the axial position of this shaft.

If desired the sleeve 122 may be directly connected to the shaft 124. In the preferred embodiment, however, I utilize a shifting means for interconnecting these elements to permit a shifting of the filter support 125 through one-half revolution with respect to the sleeve 122. This shifting means is shown as including a pin 129 extending outward from the shaft 124 and into a helical groove 130 of the sleeve 122. This groove extends helically around the sleeve from one side thereof to the other when utilizing the filter support 125 to be hereinafter described. The end portions of this groove preferably extend parallel with the axis of the shaft 124 so that when the pin 129 is in either of these end portions there will be no force component tending to move the shaft 124 axially. If, however, it is desired to shift the filter support 125 with respect to the sleeve 122, and thus incidentally change the relationship between the color filters and the film, the shaft 124 is moved into its dotted line position indicated by the numeral 132 so that the pin 129 follows the helical groove and assumes a position indicated by the dotted lines 133. The shaft 124 is thus turned one-half a revolution with respect to the sleeve 122. This axial movement of the shaft 124 can be effected through any suitable means. In the form shown a knurled wheel 135 is rotatably connected to the forward end of the shaft 124 as by a bolt 136. Thus, regardless of whether or not the projector is operating the operator can clasp the knurled wheel 135 and shift the axial position of the shaft 124.

The outer portion of the enclosing structure 101 defines a gear box 140, and the outer ends of the shafts 116 and 118 extend into a gear chamber 141 of this gear box. I have found it very desirable to be able to change the relative or overall speed of the shutter 112 and the filter support 125, and this can be done by any suitable speed-changing mechanism associated with the gear box 140. The speed-changing mechanism shown includes a series of change gears driven by a drive shaft 145 which is directly or indirectly connected to the drive means actuating the film-advancing means 25. As disclosed in Fig. 1, this film-advancing means may include a shaft 146 which can be connected to the shaft 145 through any suitable connecting device. The drive shaft 145 carries a steep-pitched worm 147 which is meshed with a worm gear 148 secured to a countershaft 149. The net speed of the countershaft 149 may be changed by changing the worm 147 and worm gear 148 so that any desired speed of the countershaft can be obtained.

This countershaft is journalled in half-bearings respectively formed by the enclosing members 102 and 103 so that it can be readily removed when the enclosing structure is separated as shown in Fig. 2. The countershaft extends through the chamber 141 and carries drive gears 150 and 151 positioned therein. These gears are respectively meshed with gears 152 and 153 respectively secured to the shafts 116 and 118. By changing the gear sets it is thus possible to change the relative speeds of the shafts 116 and 118 and thus change the relative speeds of the shutter 112 and the filter support 125.

The details of construction of the filter support 125 are diagrammatically illustrated in Figs. 2 and 9. The form illustrated includes a flanged plate 155 and an insert plate 156 suitably secured therein. In the form shown these plates have formed therein two outer openings 157 and 158, and two inner openings 159 and 160. The color filters, usually in the form of glass plates suitably colored, are positioned between the plates 155 and 156. These color filters substantially correspond in color to the filters used in making the color-value images appearing upon the film 24. If a two-color system is utilized, the opening 157 may contain a green filter, while the opening 158 bounds a red filter. With this arrangement the opening 159 would contain a red filter, while the opening 160 would contain a green filter. The filter support 125 can thus be considered as providing an outer series of filters and an inner series of filters, the filters in each series being of alternate color. The openings 157 and 158 are so arranged as to successively intercept the beam of light passing through the lower lens system 56, while the openings 159 and 160 are disposed to successively intercept the light rays passing through the upper lens system 55. Thus, at one instant of time the beam passing through the lens system 55 will be red while the beam passing through the lens system 56 will be green, and at a succeeding instant of time, and when the film 24 has been advanced one frame by the film-advancing means 25, the color filters will be reversed. Each color-value image appearing on the film is thus twice projected, but each time this image will be projected through a filter corresponding in color to the filter used in exposing this color-value image.

An important feature of the present invention lies in the particular shutter 112 utilized. Heretofore attempts have been made to use the type of shutter indicated in Fig. 11, rotating this shutter at the same angular velocity as the filter support 125. Previous attempts to use such a shutter have invariably included the pivoting of this shutter about an axis spaced from the axis of rotation of the filter support 125. In the present invention this shutter is preferably rotated at a higher speed than the filter support 125 and also about an axis which is preferably coextensive with the axis of the filter support. The type of shutter illustrated in Fig. 11 includes a shutter disc providing a pair of openings 163 and a pair of blades 164. Assuming that the shutter is rotated as indicated by the arrow 166, each blade 164 includes an entry edge 167 and a trailing edge 168. Heretofore such a shutter has been pivoted about an axis so positioned that the entry edge 167 moves first into one lens beam and then into the other. I have found that this produces a distinct color beat, for at one instant of time only a red image will be projected onto this screen, while at another instant of time only a green image will be so projected. Such successive projection of individual images, even though they exist only for a minute period of time, makes it impossible to obtain the reproduction of proper color values. So also, the resulting images produce a distinct eye strain. In the present invention, these difficulties are overcome by so positioning the axis of rotation of the shutter that the entry edge 167 enters the beams of both lens systems at substantially the same instant. Similarly, the trailing edge 168 leaves the beams at substantially the same instant. If desired, these edges may be made so that a projection thereof is tangential to a circle around the axis of rotation, thus permitting these edges to substantially simultaneously enter the beams and substantially simultaneously leave the beams. In other instances, it is possible to form the edges 167 and 168 so that they extend radially with respect to the axis of rotation, as shown in Fig. 11. This permits substantially a simultaneous entry and departure of these edges from the two beams.

I have also found that superior results can be obtained in the reproduction of colored motion pictures if the angular velocity of the edges 167 and 168 is increased so that the beams are cut-off and subsequently cut-in at a higher speed than has previously been utilized. If, then, the shutter disclosed in Fig. 11 is rotated at an angular velocity which is twice, or any multiple of, the angular velocity of the filter support, the result will be that during the time that one shutter blade cuts off these beams the film can be shifted to its next position, and during the projection while the film images are in this new position one or more of the blades may move quickly through the beams. I have found that the results of this increased speed of the shutter is to eliminate all apparent flicker.

Figure 10:
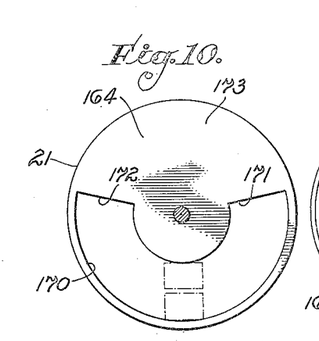
Fig. 10 is a face view of one form of shutter taken as indicated by the arrow 10 of Fig. 2.

Usually, however, I find it preferable to utilize a shutter of the type shown in Fig. 10. In this form of shutter the shutter disc includes an opening 170 bounded by an entry edge 171 and a trailing edge 172, thus providing a single-blade 173. The edges 171 and 172 may be positioned as previously set forth. This form of shutter requires that the shutter speed be at least twice the speed of the filter support 125, but I find it preferable to operate the shutter at even higher speeds, so that at one instant of time the blade 173 will momentarily cut off the beams to permit shifting of the film, and will at a later instant of time move through these beams projected from the now stationary film images. If the speed ratio between the shutter and filter supoprt is made 4:1 the blade 173 will thus move through the beams once during the time that the film is not moving. If this ratio is made higher this blade will move through the beams at a correspondingly greater number of times during the interval that the film is not moving.

Figure 12:
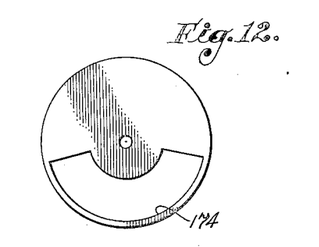
Figure 14:
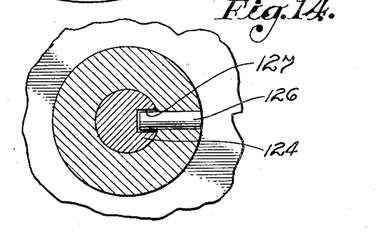

At such higher ratios, however, I prefer to use a shutter such as disclosed in Fig. 12. This is a single-blade shutter, but the opening 174 therein extends over an angular distance of somewhat less than 180°, thus allowing the blade to extend over a greater angular distance and thus permitting sufficient time for the film to shift during one of the short intervals of time that the blade intercepts the beam. This shutter is operated at relatively high speeds, these speeds being a multiple of the speed of rotation of the filter support 125 so that the blade moves through the beams a number of times during the interval that the light is being projected through the stationary color-value images.

Considering the general operation of the preferred embodiment of the invention, the filter support 125 is moved through one-half a revolution each time that the film is advanced one frame, as previously described. Considering that the upper frame comprises a red color-value image at a given instant of time, and the lower frame a green color-value image, the filter support 125 will be so positioned that a red filter intercepts the beam passing through the upper lens system 55 and the green color filter intercepts the beam passing through the lens system 56. The entry edge of the shutter then simultaneously intercepts these beams and the film is advanced one frame, thus projecting a red color-value image through the lower lens system 56 and projecting a new green color-value image through the upper lens system 55. During the time that the shutter blade has cut off the light beams and the film is being advanced, the filter support 125 turns so as to bring the color filters in front of the lens system in reverse order, the red filter now intercepting the rays through the lower lens system 56 and the green filter intercepting the rays through the upper lens system 55. When the filter support is thus positioned, the trailing edge of the shutter sweeps through these beams, thus allowing the new image to be projected onto the screen.

The resulting screen image is, of course, a superimposed red and green image, thus producing a resultant composite image having substantially true color values. It is, however, necessary to accurately register the constituent images, and this is accomplished by the adjustment means heretofore described. If the images are out of lateral adjustment, the lateral adjustment means 54 is actuated to turn the lens systems simultaneously. Such a turning action shifts one of the lens systems sidewise with respect to the other and thus brings the constituent images into lateral adjustment. This movement is so slight that it does not materially change the longitudinal or vertical adjustment of the images as would be the case if the outer barrel 37 were rotated through a large angle. In any event, however, it is possible to accurately bring the constituent images into correct longitudinal adjustment by turning the longitudinal adjustment means 91, thus moving the lens systems toward and away from each other until the desired registry is obtained. Correct focus of the images can be obtained by holding the longitudinal adjustment means 91 and turning the focus adjustment means 94 as previously described.

It is thus apparent that the filter support 125 must be synchronized with the film movement, and the film must contain alternate red and green color-value images. If the filter support happens to be so positioned that the filters are oppositely disposed with respect to their true position, the resulting image will not appear in true color value. To bring this filter support into correct relationship it is only necessary for the operator to shift the knurled wheel 135 into one or the other of the positions shown in Fig. 2. Similarly, if the film should be defectively spliced so that two red color-value images appear on adjacent frames, the sequence will be disrupted. The defect can be immediately cured, however, by movement of the knurled wheel 135 into an opposite position.

The construction shown can be adjusted for any desired filter support and shutter by removing the enclosing member 103 and replacing any or all of the change gears, substituting gears having the desired ratio.

As previously described, the lateral adjustment means 54 turns the outer barrel 37, this turning being permitted by flexing the arms 38 and 39. It is not necessary in all instances to use this system of flexible arms in permitting this turning motion of the outer barrel 37. Thus, in Figs. 15 and 16 I have shown an alternative form of the invention in which the outer barrel is indicated by the numeral 200 and is of solid construction between the lens systems and the rear wall 28. In this form of the invention this rear wall carries a vertical flange 202 which acts to journal the rear end of the outer barrel 200, thus permitting the turning of this barrel about its horizontal axis. The arms of the mounting means 75 are pivoted in plates 203 and 204 which may be fixed to the rear wall 28 or may be secured to the barrel 200. The former construction is preferable in that it permits the septum means to lie in a horizontal plane at all times. The pivot means previously described may be utilized, the elongated openings being indicated by the numeral 205 and being formed in the plates 203 and 204.

Figure 17:
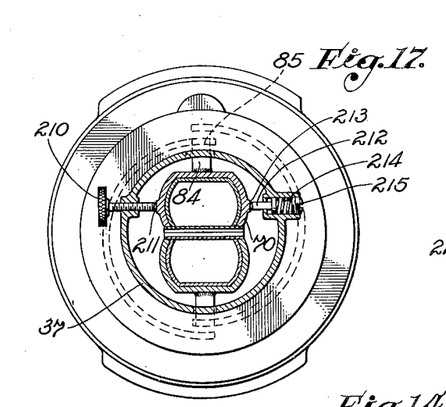
Figs. 17 and 18 are vertical sectional views illustrating alternative forms of adjustment means and are taken substantially in the plane indicated by the line 7—7 of Fig. 2.

Similarly, while it is very desirable to change the lateral adjustment of the constituent images by slightly turning the outer barrel 37 about its horizontal axis, this is not always necessary. In Fig. 17 I have illustrated an alternative form of lateral adjustment means. In this form of the invention, it is not necessary to rotatably mount the outer barrel 37. Instead, a screw 210 may be threaded through this outer barrel and bear against a flat portion 211 of one or the other of the lens cases 70. The inner end of the screw may be journalled in the lens case so that this case follows the in-and-out movement of the screw, thus changing the lateral position of this lens structure with respect to the other lens structure. In the form shown I have illustrated a pin 212 slidably journalled in a cavity of the outer barrel 37 and resiliently urged into contact with the flattened portion 213 of the lens case 70 by a spring 214 held in this cavity by a cap 215. This spring thus urges the lens case leftward, as shown in Fig. 17, and into engagement with the end of the screw 210. If desired, the longitudinal opening 85 of the outer barrel, and which receives the arm 84, may be made slightly larger so as to permit this sidewise movement of one of the lens systems with respect to the other. The flattened portions 211 and 213 permit the lens systems to be moved toward and away from each other by the longitudinal adjustment means 91 previously described.

Figure 18:
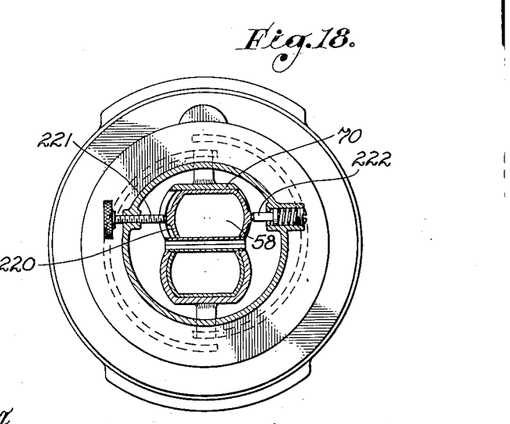

In the form of the invention shown in Fig. 18 lateral adjustment is effected through lateral shifting of only one of the lens elements of one lens system. As shown, only the front lens element 58 of the upper lens system 55 is thus movable, and this combination is very desirable in certain instances. As illustrated this lens element is mounted in a shell 220 which is horizontally slidable in the main lens case 70. The adjustment means herein shown is very similar to that shown in Fig 17, the shell 220 providing flattened portions which respectively engage a screw 221 and a resiliently movable pin 222. In this form of the invention longitudinal adjustment of the constituent images is effected by the same means previously described.

While I have herein disclosed a projector in which the lens systems are vertically disposed, it should not be understood that I am limited to this structure. Horizontally disposed lens systems can be used in conjunction with color-value images appearing side by side on the film. In this instance a rotary filter support is unnecessary, for each lens system will always cover color-value images exposed through the same color filter. With such a system the flattened surfaces 61 will be formed as hereinbefore described, if desired. These flattened surfaces will then lie in a vertical plane. To prevent the flicker which will appear at the sides of the projected image the most horizontally extended portions of the two lens systems will be ground away, a portion of each lens system being removed, which portion lies on the opposite side of the optical axis from the flattened surfaces 61 of this lens system.

Further, while I have disclosed the details of the invention in conjunction with a projector, it should be understood that certain of the features of the present invention are not limited to such a combination.

I claim as my invention:

1. In combination, an aperture plate having an aperture, a flexible elongated lens support, means for pivoting the support on an axis parallel to the aperture, and means to twist the flexible support about its longitudinal axis.

2. The combination of claim 1 in which said pivot means comprises a support elongated in a direction axially of the supporting means, and means to move the lens support on the pivot support.

3. In combination, an aperture plate having two adjacent projection apertures, two flexible elongated lens supports, a lens unit in the forward end of each support, means to pivot said supports adjacent said apertures, means to move the lens supports on said pivots, and a septum construction comprising a guide element relatively fixed between the apertures and a flexible septum member extending from the lens units and telescopic with relation to said guide element.

4. The combination of claim 3, including means to move the respective lens units relatively toward and away from each other, and means for endwise focusing movement of the respective lens units.

5. A projector apparatus comprising a double aperture plate, a pair of relatively adjacent lens systems spaced from said plate, means for adjusting said lens systems endwise for focusing and also laterally with respect to each other, and a flexible septum structure extending from between said lens systems to said aperture plate having means for preserving the portion thereof at the locality of the aperture plate against movement, and for preserving the continuity of the septum structure throughout the range of endwise and lateral adjustments of said lens systems.

6. A projector apparatus as set forth in claim 5, having a support with a flexible, elongated rearward extension pivoted adjacent said aperture plate for mounting each lens system.

7. A projector apparatus as set forth in claim 5, wherein the forward portion of the septum structure embodies two flexible plates, the forward ends whereof move respectively with the lens systems and the rear ends whereof are held from lateral movement.

8. A projector apparatus as set forth in claim 5, wherein the septum structure embodies two flexible plates each fixed to one of the lens systems and movable therewith at its forward portion, said plates having rear end portions in telescopic engagement with a fixed septum member at the locality of the aperture plate.

9. A projector apparatus as set forth in claim 5, wherein the septum structure embodies a fixed guide member with a thinned rear portion extending between the film apertures and a socket at its forward portion, with flexible plate septum members slidably fitting into said socket and extending forwardly with the front portion of each thereof fixed to one of the lens systems and partaking of the adjustments thereof.

10. A projector apparatus comprising a double aperture film plate, two lens systems mounted in holders spaced forwardly of the film plate, means for adjusting said lens holders toward and from each other, means for adjusting said holders angularly and means for adjusting said holders lengthwise for focusing, said holders having flexible elongated portions extending rearwardly and pivoted adjacent said apertures, a septum structure having a rear portion between the film apertures fixed with respect thereto and a forward portion continuously engaged with said rear portion but flexible and engaged with the respective lens systems to partake of all the movements thereof.

11. A projector apparatus as set forth in claim 10, having an enclosing structure forwardly of said lens systems, and a shutter and color filter mounted in the enclosing structure.

12. A projector apparatus as set forth in claim 10, wherein an enclosing structure is provided with a shutter and filter support enclosed therein, means mounted in said enclosing structure for pivoting said shutter and filter support about a common axis, film advancing means, and means for synchronously driving said film advancing means and said shutter.

13. A projector apparatus as set forth in claim 10, wherein the lens systems are mounted for adjustment in an outer barrel, said barrel extending to and journaled in the rear wall of an enclosing structure, said enclosing structure providing a mounting in which spaced apart portions of said outer barrel are adapted to turn.

14. A projector apparatus as described in claim 10, having an enclosing structure, an outer barrel mounted to turn therein, said barrel having the lens systems mounted therein, and means for angularly adjusting said barrel with respect to said enclosing structure, said barrel having a rearward extension journaled in the rear wall of said enclosing structure.

15. A projector apparatus as described in claim 10, wherein an enclosing structure has an outer barrel journaled therein, said barrel bearing said lens systems, and said enclosing structure having a rearward extension of said barrel journaled in its rear wall and with plates extending forwardly from said rear wall with elongated slots therein to which are fitted rearward extensions of a lens case in which the lens systems are mounted.

16. A projector apparatus for colored motion pictures comprising; a double lens system, means for focusing the same, an enclosing structure having a shutter and a color filter journaled therein side by side on a common axis, driving connections for said shutter and driving means engaged with said connections for operating the color filter, said driving means embodying a shaft slidably keyed to the color filter to be moved endwise axially thereof, the said shaft having a pin projecting therefrom, and a gear comprising an element of said driving means bearing a spiral slot engaged by said pin, said shaft bearing at its outer end a hand piece mounted so as to be free with respect to the turning of the shaft.

17. A projector apparatus as set forth in claim 20, wherein a gear for driving the shutter has a sleeve bearing on said shaft, and said hand piece consists in a knurled wheel pivotally secured to the end of the shaft.

18. A projector apparatus for colored motion pictures comprising a double lens system, means for focusing the same, an enclosing structure having a shutter and a color filter journaled therein side by side on a common axis, a common drive shaft for operating said shutter and color filter, and change gear connections from said shaft to the shutter and color filter respectively whereby the relative rates of movement thereof may be changed.

19. A projector apparatus comprising an enclosing structure having double apertures in its rear wall, an outer barrel extending through the enclosing structure and mounted for angular adjustment therein, means on the enclosing structure for angularly adjusting said barrel, a two part lens case bearing respective lens systems mounted in said barrel, means for moving the parts of said lens case radially toward and from each other, and means mounted on said outer barrel for moving the lens systems endwise to focus the same.

20. A projector apparatus as set forth in claim 19, wherein a flexible septum device extends between said lens systems and rearwardly therefrom to a point adjacent the rear wall of said enclosing structure, said rear wall equipped with a cooperative septum member between said apertures receiving slidably the flexible septum device and holding the rear extremity thereof against turning.

21. A projector apparatus comprising an enclosing structure having an outer barrel mounted to turn therein with means for angularly adjusting the same, a two part lens case, each part bearing a lens system mounted in said barrel, a sleeve member mounted to turn on said barrel equipped with spiral grooves, each of said lens case parts having an arm fitting into said sleeve member and equipped with a projection engaging said grooves whereby the parts of said lens case may be moved radially toward and away from each other, and focus adjustment means mounted to turn on, but held from endwise movement on said barrel, said focus adjustment means having threaded engagement with said sleeve member whereby on the turning of said focus adjustment means said lens systems are adjusted endwise for focusing.

22. In a projector adapted to project onto a screen a pair of adjacent images appearing on a film, said projector including in combination: a pair of adjacent lens systems respectively receiving light rays passing through said adjacent images on said film; a rotary shutter in front of said lens system; a rotary filter support in front of said lens system; a gear box; a pair of driving members extending into said gear box and respectively driving said shutter and said filter support; a drive shaft extending into said gear box; change-gear means in said gear box and operatively connecting said drive shaft and said driving members to change the speed of said shutter and filter support; a film-advancing means; and means synchronously driving said film-advancing means and said drive shaft.

23. A combination as defined in claim 22 including a countershaft in said gear box, and in which said change-gear means includes a primary set of change gears connecting said drive shaft to said countershaft and permitting corresponding change in angular velocity of said shutter and said filter support, and in which said change-gear means includes a secondary set of change gears operatively connecting said countershaft and said shutter and a tertiary set of change gears operatively connecting said countershaft and said filter support, said secondary and tertiary sets of change gears permitting variation in the relative speeds of said shutter and filter support.

24. A combination as defined in claim 22 in which said gear box is split in two sections so that one section thereof is removable to expose said change gears.

25. A combination as defined in claim 22 in which said gear box is split in two sections so that one section thereof is removable to expose said change gears, and in which each of said sections provides a plurality of half-bearings journalling said driving members about axes lying substantially in the plane in which said gear box is split.

WILLIAM M. THOMAS.